United States Patent [19]

Pallant

[11] 3,841,891

[45] Oct. 15, 1974

[54] METHOD OF PRODUCING COLORED ALUMINUM

[75] Inventor: Jon W. Pallant, Painesville, Ohio

[73] Assignee: Metalphoto Corporation, Cleveland, Ohio

[22] Filed: Oct. 27, 1972

[21] Appl. No.: 301,439

[52] U.S. Cl. .......................... 117/8.5, 8/3, 96/35.1, 117/38, 156/3, 156/8, 156/22

[51] Int. Cl. .......................... B44d 1/52

[58] Field of Search .......................... 156/2, 3, 5, 7, 8, 12, 156/21, 22; 96/35.1; 117/8.5, 12, 38; 8/1, 3

[56] References Cited

UNITED STATES PATENTS 2,888,391 5/1959 Loughman .......................... 204/143

3,469,982 9/1969 Celeste .......................... 96/35.1

*Primary Examiner*—William A. Powell

*Assistant Examiner*—B. J. Leitten

*Attorney, Agent, or Firm*—Lawrence I. Field

[57] ABSTRACT

Anodized aluminum articles which are colored in selected areas and the method of manufacturing such articles. The articles may be sheets or plates used to identify or decorate or they can be displays or containers. More than a single color may be present in the final article.

4 Claims, 1 Drawing Figure

PATENTED OCT 15 1974 3,841,891
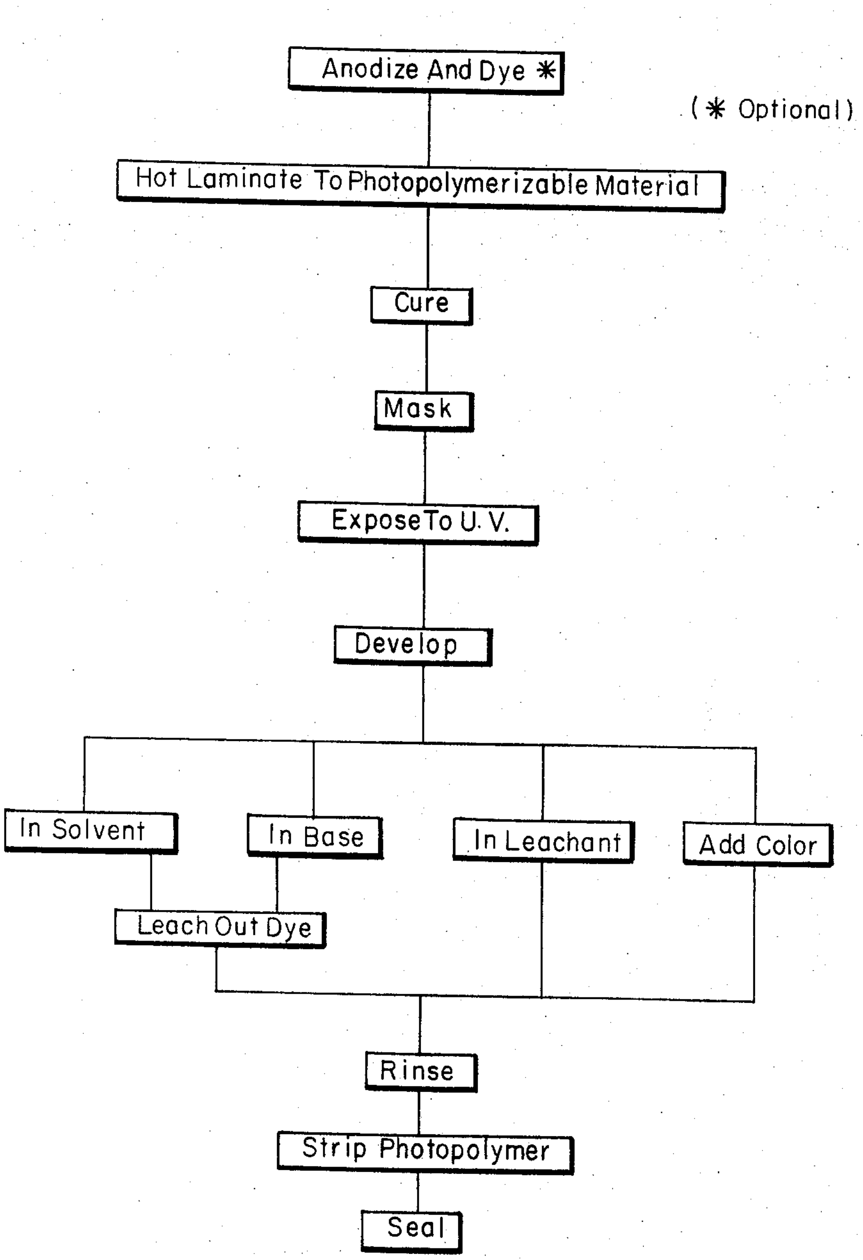

METHOD OF PRODUCING COLORED ALUMINUM

This invention relates to the manufacture of aluminum articles which have selected areas colored with one or more colors. More particularly it relates to the use of a photopolymerizable material in a specific sequence of processing steps to produce such articles.

The invention will be more fully understood from the description which follows, together with the single sheet of drawing which is a flow sheet illustrating several alternative modes of practicing the invention as applied to anodized aluminum plates, but it is to be understood that the method is also applicable to other articles than flat sheets or plates and that the finished article may be colored selectively for either aesthetic or practical reasons.

As indicated in the FIGURE, the material to which the invention is applicable is preferably an anodized aluminum sheet or plate such as is commercially available for pure aluminum or any of its commercial alloys. The anodizing of aluminum is a highly developed art and is described in detail in "Surface Treatment and Finishing of Aluminum and its Alloys" by S. Wernick and R. Pinner, published 1964 by Robert Draper Ltd., Teddington, England.

For many uses, it may be found desirable to utilize an anodized aluminum plate which has been uniformly dyed with a suitable color, unsealed, dyed, anodized aluminum articles being readily available. For other purposes, the anodized aluminum is not dyed and is the usual silvery metallic color of aluminum.

After cleaning, if required, the anodized plate whether dyed or not dyed, is laminated to a photopolymerizable material such as those described in U.S. Pat. No. 3,469,982.

The lamination is preferably applied by preheating the aluminum plate to about 50°C (e.g. between about 40°C and 55°C) and then applying the photopolymerizable material to the preheated plate while passing them between heated laminating rolls. After the plate has been coated with the photopolymer it is permitted to cure before further processing.

The photopolymerizable material is preferably one which is colorless, or it may be one which has a color similar to the color of the anodized plate if it has been dyed. For example, an orange fluorescent photo polymer film would be used with an unsealed red-dyed anodized aluminum plate. A blue or purple resist is used for a blue-dyed unsealed anodized aluminum plate.

Thereafter selected areas of the plate are masked by any suitable means leaving other areas unmasked, while the laminated plate is exposed to a sufficient dose of U.V. radiation to effect the polymerization of the unmasked areas of the coating on the plates.

The resist is then "developed" by applying a solvent to the surface, whereby the unpolymerized areas are washed off, and with some solvents the dye in the plate may be leached from the bare areas of the plate.

The plate is then rinsed and is then immersed in a liquid or exposed to a vapor for the purpose of leaching dye from the bare areas. After leaching is completed to the desired extent, the plate is rinsed.

The rinsed plate is then stripped of the polymer remaining on the areas which had been exposed to U.V. The stripping is effected either mechanically or by means of a solvent which may be heated.

As a final step the colored anodized plate is sealed in a boiling solution of nickel acetate or by other conventional sealing techniques described in Wernick and Pinner, noted above.

The following examples are intended to illustrate preferred embodiments of the invention and are not intended to limit the same.

EXAMPLE 1

A dyed anodized unsealed aluminum sheet was coated with the photopolymerizable material described in U.S. Pat. No. 3,469,982 by pre-heating the aluminum plate between 45°C and 52°C, and then passing the plate through heated laminating rolls and applying the material to the unsealed dyed aluminum plate. After the plate has been laminated, the resulting resist was allowed to cure before further processing.

After lamination and a curing period, the resist was then exposed to a light source high in ultra-violet, preferably with a peak output in the region of 3,660 millimicrons. Areas of the plate which are to be clear were covered with a suitable mask such as a stencil, a photographic negative or in this example, Eastman Kodak litho film, which has only clear and opaque areas. After exposure, the area which had not been exposed to the ultra-violet light was developed, preferably by immersion in 1,1,1-trichloroethane or similar solvent, for between about 30 and 180 seconds. After development, the plate was vigorously rinsed with cold water to remove the trichloroethane and any photo resist which has been loosened from the plate by the solvent. After rinsing the plate, the plate was immersed into a leachant for example, a solution containing 1 to 10 percent potassium dichromate and 1–10 percent nitric acid. Other acidic leachants which will leach the anodized dye from the unsealed layer without attacking the layer or the remaining resist may be used.

Again the plate was rinsed with a hard spray of cold water to remove the leachant. The plate was then immersed into a stripping solution which removes the balance of the photopolymerized film resist from the surface of the dyed, unsealed, anodized aluminum but which does not remove the dye. A suitable stripper is methylene chloride, which may have its surface covered with water to lessen evaporation. Immersion time for stripping the balance of the photopolymerized film was from 30 seconds to 3 minutes. After the balance of the resist had been removed, the unsealed dyed anodized aluminum plate which now had clear and dyed areas was sealed in any of the commercially known methods for sealing anodized aluminum. In this example it was sealed by immersion in a sealing solution of pure or deionized water with nickel acetate salts added.

EXAMPLE 2

The procedure of Example 1 was followed to the point of removing the balance of the photopolymerized resist. At this point, a color was added to the exposed unsealed area from which the original dye had been leached, by application of a solvent soluble dye to the bare unsealed pores of the anodized aluminum. Dyes which are commonly used to dye anodized aluminum, such as those described in Wernick and Pinner's text, noted above, or other dyes which are soluble in ketones which do not dissolve the photopolymerized film are suitable. After this dyeing with the second color, the balance of the resist was removed and the anodic layer was sealed as in Example 1.

EXAMPLE 3

The plate may be coated with a film resist which uses a resist which may be developed in suitable bases including each of the following: 1 to 5 percent trisodium phosphate, 1 to 5 percent sodium hydroxide, or 1 to 5 percent sodium carbonate, or ammonium hydroxide by weight in water.

After coating and curing as in Example 1, a plate was exposed with an ultra-violet light source having peak output of 3,660 millimicrons using a suitable mask. After exposure, the plate was developed in an aqueous base for one to five minutes. During the development step, if the proper dyes have been used, the developer will leach the dye as well as develop the photopolymer film, thus accomplishing the developing and leaching steps in a single operation. When sodium hydroxide is used and the plate is allowed to remain in this solution for a sufficient time, usually 5 to 10 minutes, the anodic layer may be dissolved from the metal base and thus leave the base aluminum showing, which gives a very pleasing effect. The anodic layer may also be stripped using trisodium phosphate in which case a matte finish background may be produced so that if the aluminum which was anodized was of a high gloss, that area will be bright, with the area which has had the anodic layer removed being matte, or non-reflective.

The developer solutions, such as trisodium phosphate and sodium hydroxide may have inhibitors added such as sodium metasilicate. By adding a sufficient amount of inhibitor, the photo polymer film may be developed and the dye leached without attacking the anodic layer. After developing and leaching, the balance of the photo polymer film may be stripped and the plate sealed as in Example 1.

EXAMPLE 4

The process of Example 2 was repeated except that the leaching step was omitted so that the added color was added to the original dye to produce a new color, contrasting with the original dyed areas, under the resist. The balance of the process in Example 2 was then performed.

I claim:

1. A process for producing anodized aluminum articles in which selected surface areas are colored, which comprises:

preheating an unsealed, dyed anodized article;

laminating the preheating anodized article to a transparent photopolymerizable material;

curing the resulting laminate;

exposing the photopolymerizable material to a pattern of suitable radiation sufficient to effect the polymerization of areas exposed to said radiation;

developing the resulting resist by applying a solvent for the unpolymerized, photopolymerizable material, to the surface of the article after said exposure step;

leaching the dye from the resulting bare areas of said surface;

rinsing the article;

coloring the bare areas from which the dye has been leached;

stripping the polymerized areas from said article;

and thereafter sealing the resulting colored article.

2. The process of claim 1 in which the photopolymerizable material has a color similar to the color of the dyed anodized article.

3. The process of claim 1 in which the leaching material is a solution of potassium dichromate and nitric acid.

4. The process of claim 1 in which the resist is developed in an alkaline liquid whereby the leaching and developing steps occur simultaneously.

* * * * *